United States Patent [19]

Hergenrother et al.

[11] 3,859,382
[45] Jan. 7, 1975

[54] METHOD OF MAKING NYLON CONSTITUENT BLOCK COPOLYMERS OF PREDETERMINED PLIABILITY AT LOW TEMPERATURES

[75] Inventors: William L. Hergenrother; Richard J. Ambrose, both of Akron, Ohio

[73] Assignee: The Firestone Tire & Rubber Company, Akron, Ohio

[22] Filed: Jan. 26, 1973

[21] Appl. No.: 326,710

Related U.S. Application Data

[63] Continuation-in-part of Ser. No. 219,161, Jan. 19, 1972.

[52] U.S. Cl.......... 260/859, 260/77.5 CR, 260/857, 260/859
[51] Int. Cl........................ C08g 41/04, C08g 22/02
[58] Field of Search............ 260/77.5 CR, 857, 858, 260/859

[56] References Cited
UNITED STATES PATENTS
3,468,972   9/1969   Hsieh................................. 260/836
FOREIGN PATENTS OR APPLICATIONS
38-7146   5/1963   Japan.......................... 270/77.5 CR OTHER PUBLICATIONS
English Translation of Japan 38-7146, U.S. Patent Office.
Godfrey et al., Jour. Polymer Science, Part A-1, Vol. 7, pages 2387-2404 (1969).

Primary Examiner—H. S. Cockeram

[57] ABSTRACT

Polymers of anionically polymerized monomers are made with an organo alkali metal initiator and then reacted with either polyisocyanates or polyisothiocyanates which remove the alkali atoms and form a novel polymeric composition containing isocyanate or isothiocyanate terminated polymers. These polymers may then be reacted with compounds containing an isocyanate or an isothiocyanate reactive group. The isocyanate or isothiocyanate terminated polymers under anhydrous polymerization conditions may also be blocked with nylon forming monomers to form various nylon block copolymers. The isocyanate or isothiocyanate terminated polymers of the polymeric composition when reacted with urea forming monomers produce urea block copolymers. Reaction of the isocyanate or isothiocyanate terminated polymers with urethane forming monomers will produce urethane block copolymers. The isocyanate and isothiocyanate terminated polymers of the polymeric composition when reacted with imide forming monomers produce imide block copolymers. All of these block copolymers have the surprising property of generally being processable at ambient or low temperatures.

It has now been found that at low temperatures the pliability of the block copolymers which possess a nylon constituent is surprisingly and unexpectedly inversely proportional to the molecular weight of the nylon constituent.

10 Claims, 1 Drawing Figure

Relationship of Reciprocal Plasticity
To Calculated Molecular Weight of Blocked
Nylon-6 In Butadiene-ε-Caprolactam
Polymerization Mixtures

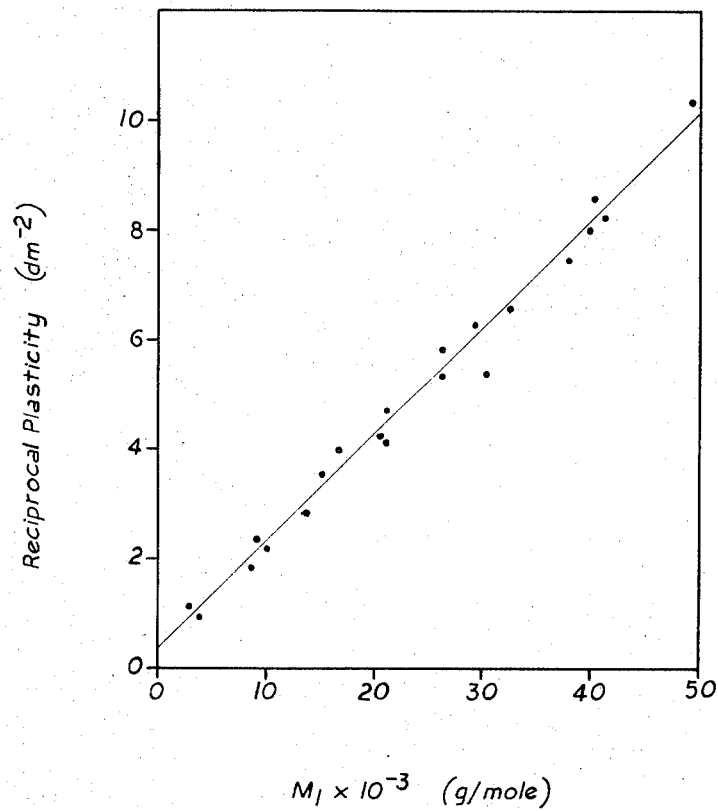
Relationship of Reciprocal Plasticity To Calculated Molecular Weight of Blocked Nylon-6 In Butadiene-ε-Caprolactam Polymerization Mixtures

METHOD OF MAKING NYLON CONSTITUENT BLOCK COPOLYMERS OF PREDETERMINED PLIABILITY AT LOW TEMPERATURES

CROSS REFERENCE TO RELATED APPLICATION

This application is a continuation-in-part of my copending application bearing U.S. Ser. No. 219,161, filed Jan. 19, 1972.

BACKGROUND OF THE INVENTION

The present invention relates to the formation of polymeric compositions containing polymers terminated by either an isocyanate or an isothiocyanate. The invention also relates to the reaction of these polymers with a compound containing an active hydrogen. In another aspect, the present invention relates to the formation of nylon block copolymers by reacting the isocyanate or the isothiocyanate terminated polymers with nylon forming monomers. In yet another aspect, the present invention relates to the formation of urea block copolymers by reacting the isocyanate or the isothiocyanate terminated polymers with urea forming monomers. In yet another aspect, the present invention relates to the formation of urethane block copolymers by reacting the isocyanate terminated polymers with urethane forming monomers. In yet another aspect, the present invention relates to the formation of imide block copolymers by reacting the isocyanate or the isothiocyanate terminated polymers with imide forming monomers. In still another aspect, the present invention relates to a method for making nylon block copolymers of a predetermined pliability at low temperatures.

The polymerization of conjugated dienes and/or vinyl substituted aromatic compounds with organo alkali metal initiators is well known in the art. The resulting alkali metal terminated polymers often are reacted with polyfunctional compounds to couple the polymers. For example, as disclosed in U.S. Pat. Nos. 3,135,716 and 3,468,972 coupling agents which may be polyisocyanates or polyisothiocyanates are employed to replace terminal alkali metal atoms and to couple the polymers. In another U.S. Pat., No. 3,225,119, isocyanates are reacted with the alkali metal terminated polymers to form an A-B-A type block polymer wherein A represents a polymer made from isocyanate monomers. In yet another U.S. Pat., No. 3,281,383, compounds having at least three functional groups such as the polyisocyanates are coupled through the reaction with alkali metal terminated polymers to yield "radial" or multiple long branched polymers. None of these patents, however, disclose the preparation of anionically polymerized polymers which are terminated by isocyanates or isothiocyanate groups. Furthermore, anionic polymers used in the preparation of block copolymers having a constituent other than the polymer or which constituent is made solely from isocyanate monomers are not disclosed.

Prior U.S. Pats., Nos. 3,291,859 and 3,396,210, disclose a polymeric moiety which is formed by reacting a polymer which contains at least one active hydrogen with a polyisocyanate containing material. However, these patents do not disclose a base polymer which lacks an active hydrogen and yet is bonded to a polyisocyanate. The U.S. Pat. No. 3,291,859 also discloses that the polymer moiety can be used for making a block copolymer but only when a dual functional free-radical initiator is used.

Another aspect of the prior art relates to the desirability of using nylon as a molding resin for specific end use requirements. The nylon used often had a relatively low molecular weight in order that the nylon would possess the low melt viscosities necessary to fill molds rapidly. However, the use of low molecular weight nylon is undesirable since often toughness, which increases with molecular weight, is sacrificed.

Yet another aspect of the prior art relates to the use of urea polymers for specific end use requirements. However, these polymers generally are not processable at temperatures below the melt temperature of the polymer.

Yet another aspect of the prior art relates to the use of urethane polymers for specific end use requirements. However, these polymers generally are not processable at temperatures below the melt temperature of the polymer. Another aspect of the prior art relates to a thermoplastic urethane elastomer which is a block copolymer but is only processable at temperatures above its melting point.

Yet another aspect of the prior art relates to the use of imide polymers for specific end use requirements. However, these polymers generally cannot be molded, milled or processed at temperatures below the melt temperature of the polymer.

SUMMARY OF THE INVENTION

It is, therefore, an object of the present invention to produce anionic polymerized polymers which are reacted with either polyfunctional isocyanates or polyfunctional isothiocyanates to provide a polymeric composition containing isocyanates or isothiocyanate terminated polymers.

It is also an object of the present invention to produce isocyanate terminated or isothiocyanate terminated polymers which are reacted with active hydrogen compounds.

It is another object of the present invention to provide a new nylon block copolymer by reacting an isocyanate or isothiocyanate terminated polymer with nylon forming monomers.

It is yet another object of the present invention to provide a nylon block copolymer which has rubbery properties or is suitable as a thermoset and yet otherwise generally retains the properties characteristic of nylon.

It is a further object of the present invention to provide a nylon block copolymer which is readily molded below the melt temperature of the nylon constituent.

It is another object of the present invention to provide a new urea block copolymer by reacting an isocyanate or an isothiocyanate terminated polymer with urea forming monomers.

It is yet another object of the present invention to provide a new urea block copolymer which has processable properties at temperatures below the melt temperature of the urea constituent.

It is another object of the present invention to provide a new urethane block copolymer by reacting an isocyanate terminated polymer with urethane forming monomers.

It is yet another object of the present invention to provide a new urethane block copolymer which has processable properties at temperatures below the melt temperature of the urethane constituent.

It is another object of the present invention to provide a new imide block copolymer by reacting an isocyanate or an isothiocyanate terminated polymer with imide forming monomers.

It is yet another object of the present invention to provide a new imide block copolymer which is millable, moldable and processable at temperatures below the melting point of the imide constituent.

It is yet another object of the present invention to provide a method for the production of anionically polymerized polymers which are terminated by either an isocyanate or an isothiocyanate.

It is yet another object of the present invention to provide a method for the production of isocyanate or isothiocyanate terminated polymers which are connected to active hydrogen compounds.

It is yet another object of the present invention to provide a method for the production of a new nylon block copolymer.

It is still another object of the present invention to provide a method for the production of a new nylon block copolymer having at low temperatures a predetermined pliability which increases as the molecular weight of the nylon constituent decreases.

It is yet another object of the present invention to provide a method for the production of a new urea block copolymer.

It is yet another object of the present invention to provide a method for the production of a new urethane block copolymer.

It is yet another object of the present invention to provide a method for the production of a new imide block copolymer.

These and other objects of the present invention will be apparent in view of the following detailed description and are accomplished by means hereinafter described and claimed.

In general, a polymeric composition containing isocyanate or isothiocyanate terminated polymers can be produced by anionically polymerizing certain monomers with an organo alkali metal initiator and then reacting the resulting polymers with polyfunctional isocyanates or isothiocyanates. The isocyanate or isothiocyanate terminated polymers may be reacted with compounds containing an active hydrogen. Reaction of either the isocyanates or the isothiocyanate terminated polymers with nylon forming monomers under anhydrous conditions will produce a nylon block copolymer. Reaction of either the isocyanate or the isothiocyanate terminated polymers with urea forming monomers will produce urea block copolymers. The isocyanate terminated polymers when reacted with urethane forming monomers will produce urethane block copolymers. Reaction of either the isocyanate or the isothiocyanate terminated polymers with imide forming monomers will produce imide block copolymers.

BRIEF DESCRIPTION OF THE DRAWING

The drawing is a graph which shows the plasticity correlation of the block copolymers to the calculated molecular weight of blocked nylon-6 in the block copolymers.

PREFERRED EMBODIMENTS OF THE INVENTION

The monomers which can be anionically polymerized by the initiators described herein to form a base polymer and then reacted with the polyisocyanates or polyisothiocyanates also described herein to prepare isocyanate or isothiocyanate terminated polymers include a wide variety of materials. Generally, any monomer capable of undergoing anionic polymerization can be used. Some of these monomers can be generally classified as olefins since they contain at least one olefinic group and may be represented by the following structural formulae, wherein R is hydrogen, alkyl or cycloalkyl and wherein Ar is an aromatic ring or a substituted aromatic ring:

1. $CH_2=CACN$ wherein A is $CN$, $CF_3$, $CH_3$, or H
2. $CH_2=CACO_2R$ wherein A is $CO_2R$, $SO_2R$, $CH_3$ or H
3. $CH_2=CANO_2$ wherein A is Cl, $CH_3$ or H
4. $CH_2=CACON(R)_2$ wherein A is $CH_3$ or H Other monomers which can be anionically polymerized are represented by the following structural formulae:

5. 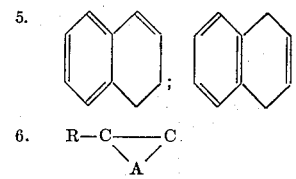

6. $R-C\underset{A}{\overset{}{\diagdown\diagup}}C$ where A is O or S and R is H or an aliphatic, cycloaliphatic or aromatic group containing from 1 to 15 carbon atoms, inclusive.

7. $RCH=A$ where A is O or S and R is an aliphatic, cycloaliphatic or aromatic group containing from 1 to 15 carbon atoms, inclusive.

8. 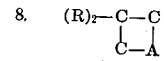

where A is O or S and R is an aliphatic, cycloaliphatic or aromatic group containing from 1 to 15 carbon atoms, inclusive.

9. $(R)_2C=S$ where R is an aliphatic, cycloaliphatic or aromatic group containing from 1 to 15 carbon atoms, inclusive.

The monomers as represented by formulae 6, 7, 8 and 9 are preferred in the subject invention. Examples of such monomers include ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isobutyrthioaldehyde, n-caprothioaldehyde, 3-dimethyloxycyclobutane, 3-diethyloxycyclobutane, 3-methylethyloxycyclobutane, 3-dimethylthiocyclobutane, 3-diethylthiocyclobutane, 3-methylethylthiocyclobutane, methyl ethyl thioketone, methyl isopropyl thioketone and diethyl thioketone. Suitable monomers represented by formula No. 9 do not include large R's such as two phenyl groups since such monomers are difficult to polymerize due most probably to steric hindrance.

Other prefered monomers which may generally be used to prepare the isocyanate terminated polymers of this invention are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene; isoprene; 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, cycloalkyl, aryl, alkaryl and aralkyl derivatives thereof in which the total number of carbon atoms in the combined substituents is generally not greater than 12. Examples of such compounds include 3-methylstyrene; α-methylstyrene; 4-n-propylstyrene, 4-t-butylstyrene, 4-dodecylstyrene, 4-cyclohexylstyrene; 2-ethyl-4-benzylstyrene; 4-methoxystyrene; 4-dimethylaminostyrene; 3,5-diphenoxystyrene; 4-p-tolylstyrene; 4-phenylstyrene; 4,5-dimethyl-1-vinylnaphthalene; 3-n-propyl-2-vinylnaphthalene and the like.

The conjugated dienes and the vinyl substituted aromatic compounds as well as many of the other monomers noted herein generally can be polymerized alone or in admixture to form homopolymers, copolymers or block copolymers which serve as the base polymer. The dienes which are preferred, are 1,3-butadiene and isoprene, and preferred vinyl substituted aromatic monomers are styrene, α-methylstyrene and 4-t-butylstyrene. A preferred base copolymer is styrene-butadiene.

Yet another group of monomers which can be employed are the heterocyclic nitrogen containing monomers such as pyridine and quinoline derivatives containing at least 1 vinyl or alphamethylvinyl group such as 2-vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and di-substituted alkenyl pyridines and the like quinolines such as 2-vinylquinoline, 3-vinylquinoline, 4-vinylquinoline and so forth. In general, the various vinyl substituted pyridines and vinyl substituted quinolines are also preferred monomers.

The polymers are prepared by anonically polymerizing the monomers with organo alkali metal initiators in a manner which is well known to those skilled in the art. Although these initiators can be either mono- or polyfunctional, the monofunctional initiators are preferred for the present invention. The preferred metal is lithium although sodium, potassium, rubidium and cesium are generally suitable. Hence, the preferred class of compounds can be represented by the formula RLi wherein R is a hydrocarbon radical selected from the group consisting of aliphatic, cycloaliphatic and aromatic radicals containing from 1 to 30 carbon atoms per molecule. Examples of these initiators include methyllithium, n-butyllithium, n-amyllithium, n-decyllithium, phenyllithium, naphthyllithium, p-tolyllithium, cyclohexyllithium, eicosyllithium, and the like. The essential feature of these initiators is that they possess a carbonlithium bond which acts on the point of initiation for the polymerization. The growth of the polymer is also propagated through the carbonlithium bond which becomes a part of the polymer at this stage. Of the resulting polymers obtained, substantially all have a lithium atom positioned at one end.

The amount of catalyst employed depends primarily on the monomers to be used and the characteristics desired in the polymer produced. In general, an increased amount of catalyst leads to the production of a lower molecular weight polymer whereas a reduced amount of catalyst has an opposite effect. Suitable polymers having a molecular weight in the range of 10,000 to about 100,000 can be readily prepared, ordinarily by using initiator levels in the range of about 1 to 10 millimoles per 100 grams of monomer (mhm). Of course, polymers of higher or lower molecular weights can be prepared by varying the initiator level. Thus, polymers of high molecular weights which may be viscous or solid can be produced by using an initiator level of approximately 0.25 mhm or less. Generally, the initiator level for this invention is commonly in the range of about 1 to 40 mhm, although both higher and lower initiator levels can be used.

Formation of the polymers is generally carried out at a temperature in the range between $-100°$ and $+150°C$. and preferably between $-78°$ and $50°C$. with temperatures at the lower part of the range being desirable at this stage. The precise temperature of polymerization, of course, will depend to a large degree upon the particular reactivities of the monomers being reacted.

The process or the polymerizations are generally carried out in a hydrocarbon or ether medium. Normally, the solvents or diluents are paraffins, cycloparaffins or aromatics containing from 4 to 10 carbon atoms per molecule. Examples of solvents include n-butane, n-hexane, n-heptane, isooctane, cyclohexane, methylcyclohexene, benzene, toluene, xylene, tetrahydrofuran and the like. The important considerations in selecting a solvent are that they should be inert, they should have some affinity for the polymer formed and they should not contain in their structure any active hydrogen atoms, or any impurities having an active hydrogen atom such as water, alcohols, acids or groups which would have a tendency to act as a chain terminating or transfer agent.

In accordance with the concepts of the present invention, the lithium terminated polymers are reacted with a polyisocyanate or a polyisothiocyanate monomer to produce end capped polymers having at least one unreacted isocyanate or isothiocyanate end portion. The terms polyisocyanate and polyisothiocyanate are used in this specification in the sense that the compounds described by these terms are polyfunctional and therefore may react with two or more entities. The polyisocyanates and the polyisothiocyanates are preferably those compounds represented by the formula $R(N=C=X)_n$ where R can be an aliphatic containing from 2 to about 20 carbon atoms, a cycloaliphatic containing from 4 to about 20 carbon atoms and an aromatic containing from 6 to about 20 carbon atoms, $n$ is an integer of either 2 or 3, preferably 2, and $x$ is a chalcogen (oxygen or sulfur). Examples of polyisocyanates include diphenyl diisocyanates, dichloroxanylene diisocyanates, 2,4,4'-triisocyanate-diphenyl ether, triphenyl methane triisocyanate, benzene-1,2,4-triisocyanate, naphthalene-1,3,7-triisocyanate and the like. Preferred polyisocyanates include meta or paraphenylene diisocyanate, diphenyl methane diisocyanates, bitolylene diisocyanates, dianisidine diisocyanates, isophorone diisocyanates, toluene diisocyanates, hexamethylene diisocyanate and pentamethylene diisocyanate. Examples of polyisothiocyanates generally include compounds which are the same as the polyisocyanates but wherein, of course, a sulfur atom has been substituted for the oxygen atom. Thus, suitable polyisothiocyanates include diphenyl diisothiocyanates, dichloroxanylene diisothiocyanates, 2,4,4'-triisothiocyanate-diphenyl ether, triphenyl methane triisothiocyanate, benzene-1,2,4-triisothiocyanate, naphthalene-1,3,7-triisothiocyanate and the like. Preferred polyisocyanates include meta or para-phenylene diisothiocyanate, diphenyl methane diisothiocyanates, bitolylene diisothiocyanates, dianisidine diisothiocyanates, isphorone diisothiocyanates, toluene diisothiocyanates, hexamethylene diisothiocyanate and pentamethylene diisothiocyanate.

Henceforth in the specification whenever reference is made to isocyanate or polyisocyanate compounds, it should be obvious to one skilled in the art that such reference also includes isothiocyanate or polyisothiocyanate compounds. The amounts of polyfunctional isocyanates which may be used generally depend upon the particular system to be produced. For most systems, the equivalent ratio of the polyisocyanates to the alkali metal or lithium present in the polymers may range from 1.1 to about 20 while in other systems the upper limit of the range may be in excess of 100. When an excess amount is used, free polisocyanate will exist in the polymeric composition. Such free polyisocyanates, when present, can lead to the formation of free nylon at a later stage of the process when nylon-forming monomers are added. When a polyisocyanate is employed to react with the lithium terminated or base polymers, each polyfunctional isocyanate will sometimes react with a different lithium terminated polymer, thereby coupling the polymers and forming a resulting polymer which does not contain an isocyanate group on an end portion of the polymer. This situation generally cannot be avoided and therefore to achieve at least some polymers which have at least one isocyanate end group, the equivalent ratio of the polyfunctional isocyanates to the lithium must be greater than 1.0. Should the equivalent ratio be less than one but greater than 0.5 the resultant polymeric solution may contain, and when the equivalent ratio is 0.5 or less the resultant polymeric solution will likely contain, some unreacted lithium terminated polymers. When the equivalent ratio is approximately 2.0, statistical considerations reveal that when a diisocyanate is employed, approximately 50% of the polymers have an isocyanate end group. When a triisocyanate is employed with an equivalent ratio of three, the amount of polymers which are terminated by at least one unreacted isocyanate group is increased to approximately 67%. In general, as the equivalent ratio increases, the percentage of isocyanate terminated polymers increases as well as the amount of completely unreacted or free polyisocyanates. Generally, an amount of polyisocyanate should be used so that at least 5% and preferably at least 20% of the polymers are terminated by at least one isocyanate group. As should be apparent to one skilled in the art, the addition of polyfunctional isocyanates should be carried out rapidly to avoid excessive coupling.

During the process of formation of the isocyanate terminated polymers it is important that the reaction be carried out in an environment substantially free from active hydrogen compounds such as water, alcohol or acids so that the polymers are terminated by an isocyanate group. Hence, the process is usually carried out in an inert atmosphere such as in a nitrogen atmosphere.

The temperature range for the polyfunctional isocyanate reaction is generally between $-100°$ and $+150°C.$, and preferably between $-78°$ and $+70°C$. It has been found that temperatures at the lower end of the preferred range produced better results, possibly since polyfunctional isocyanate consuming side reactions are reduced.

The novel polymeric compositions containing isocyanate terminated polymers vary widely in their properties and in general, exhibit properties of the base polymer. Some of the compositions are plastic whereas others are elastic. These compositions thus can be used in a wide range of applications where they can be extruded, calendered and otherwise threated as plastics or elastics. Yet other compositions made from butadiene are rubbery and thus can be used for wire cable insulation, tire tread and inner tubes. Furthermore, these compounds can be combined with curing agents, fillers and the like and generally can be molded.

The invention will be more fully understood by referring to the following examples.

EXAMPLE 1

To a clean, dry, nitrogen purged 28 oz. beverage bottle was added 600 cc of purified tetrahydrofuran, 77.6 g of butadiene and 1.52 cc of 1.64 molar ($2.49 \times 10^{-3}$ moles) butyl lithium in hexane solution. The bottle was cooled to $-20°C$. and held at this temperature for four hours until the butadiene had polymerized. To this lithium polybutadiene which was 85% 1,2-microstructure was added rapidly 5.92 cc of a 1.22 molar ($7.21 \times 10^{-3}$ moles) toluene diisocyanate solution in toluene. The resulting polymer had an average molecular weight of 31,000.

The above polymer was cured at $160°C$. for about 34 minutes with 6 parts of dicumyl peroxide per 100 parts of polymer. The following physical properties were obtained:

| Hardness Rockwell E | Flex Strength | Flex Modulus | Izod Notch |
| --- | --- | --- | --- |
| 33 | 4,020 psi | 202,600 psi | 0.15 ft. lbs./inch notch |

EXAMPLE 2

To a clean, dry 28 oz. beverage bottle was added 500-600 cc of purified toluene, 98.1 g of butadiene and 1.43 cc of 1.75 molar ($2.5 \times 10^{-3}$ moles) butyl lithium in hexane solution. The bottle was stirred magnetically overnight at $25°C$. before rapidly adding 2.52 cc of 0.995 molar toluene diisocyanate ($2.5 \times 10^{-3}$ moles). This solution was stirred for one hour and the product was precipitated with methanol. The resulting polymer had a viscosity average molecular weight of 56,000 g/mole.

The above polymer was compounded in chloroform solution with one part of dicumyl peroxide per 100 parts of polymer. The following physical properties were obtained:

| Cure Time (minutes) | Hardness Shore A | Ultimate Elongation % | Modulus 5% | (psi) Break |
| --- | --- | --- | --- | --- |
| 4 | 53.5 | 40 | 22 | 75 |
| 20 | 63.5 | 30 | 34 | 125 |

The above described isocyanate or isothiocyanate terminated polymers of the polymeric composition may be further reacted with isocyanate or isothiocyanate reactive compounds such as compounds containing an active hydrogen. The vast majority of active hydrogen compounds which may have a molecular weight range from a very small number to that of a large polymer generally form a stable isocyanate or isothiocyanate adduct. Although the temperature range of this process may generally range from −100° to 100°C., usually, the reaction of the isocyanate or isothiocyanate terminated base polymer with a compound containing an active hydrogen will readily proceed at ordinary temperatures or after moderate heating without the use of catalysts. Catalysts, of course, may be used in the process if the reaction proceeds rather slowly. Since, generally, isocyanates as well as isothiocyanates react readily with water, it is important that the process be carried out in an environment substantially free from water such as in an inert atmosphere unless it is desired that water is to be used to produce urea. Additionally, the process is usually carried out at atmospheric pressure although suitable pressures or even a vacuum may be utilized. Obviously, the process is to be free from undesirable active hydrogen compounds so that the desired product is produced.

In general, the reaction and reactivity of isocyanates are better understood when the electronic structure of the isocyanate group and the effect on this structure of various groups attached to the nitrogen atom are considered. A qualitative consideration of the resonance hybrids from the standpoint of the molecular orbital theory indicates that the electron or charge density is greatest on the oxygen (highest net negative charge) and least on the carbon (highest net positive charge) with the nitrogen atom being intermediate in having a net negative charge. Thus, the reactions of isocyanates with active hydrogen compounds usually involve attack by a nucleophilic center upon the electrophilic carbon of the isocyanate. Disregarding steric factors, any electron-withdrawing group attached to the NCO moiety will increase the positive charge on the carbon atom and thereby increase the reactivity of the isocyanate towards nucleophilic attack. Conversely, any electron-donating group will reduce the reactivity of the NCO moiety. Similarly, the reactivity of the agent attacking the electrophilic carbon of the NCO moiety will increase as its nucleophilicity increases. Thus, generally, consideration of these factors in most cases makes it possible to predict on a qualitative basis the relative reactivity of various isocyanated base polymers with compounds containing active hydrogen. Of course, steric factors must also be considered.

The electronic structure of isothiocyanates is generally similar to the above isocyanates except that the charge density of the sulfur atom will not be as great as the charge density on the oxygen atom. Hence, isothiocyanate compounds will generally tend to be less reactive than isocyanate compounds.

As noted above, reference to isocyanate compounds hereinafter is understood to also include isothiocyanate compounds.

The many compounds which contain an active hydrogen are obvious to one skilled in the art and since the number of such compounds is large, only some of the major groups of active hydrogen compounds will be recited.

An example of a group of compounds which contain an active hydrogen are the halogen acids. When reacted with isocyanates they form carbamyl halides which are stable at room temperatures but tend to dissociate into an isocyanate and a hydrogen halide at temperatures in the range of 90°–100°C.

Another group of compounds which contain an active hydrogen are practically all of the compounds which contain a hydrogen atom bonded to a nitrogen atom. A specific example is hydrogen cyanide which when reacted with two equivalents of an isocyanate and water forms a five member ring compound which is very thermally stable in that it maintains its properties at elevated temperatures. Other examples are amines which generally react to give substituted ureas, amides which generally give acyl ureas and ureas which give biurets. Similarly, the hydrazines, amidines, nitramines and diazoamino compounds gemerally react as expected.

Yet another group of compounds which generally contain an active hydrogen are the compounds which contain a hydrogen atom bonded to an oxygen atom. Thus, all types of alcohols such as primary, secondary, tertiary and polyhydric react to give carbamate esters. Phenols including polyhydric phenols also react, especially in the presence of aluminum chloride. Weak aromatic and aliphatic carboxylic acids react to give mixed anhydrides whereas stronger acids such as trichloracetic and formic acid form mixed anhydrides which readily decompose into amides and carbon dioxide. In general, water reacts rapidly with isocyanates at ordinary temperatures to give disubstituted ureas and carbon dioxide and in the presence of sodium hydroxide to give as a principal product a primary amine.

Another group of active hydrogen compounds are those containing carbon-hydrogen bonds. Thus, the carbanions of sodiomalonic esters and related compounds produce N-substituted amines. Additionally, N-substituted aroylamides are produced by the Friedel-Crafts synthesis.

The group of compounds containing a sulfur atom bonded to a hydrogen atom generally contains an active hydrogen and such compounds usually react with isocyanates in the same way as its oxygen analog except that it is usually less reactive. Thus, hydrogen sulfide reacts with isocyanates to give disubstituted ureas and carbon oxysulfide. Additionally, compounds containing mercaptan groups may also be used.

Polymers containing an active hydrogen may also be reacted with the isocyanate terminated base polymers to form copolymers. Examples of such polymers include polyethers, polyesters, polyamines, polyimides, polyureas and the like. Of course, the polymer which is reacted with the base polymer may be formed in situ.

Reactive isocyanate compounds which do not contain an active hydrogen include lithium aluminum hydride which generally reduces aryl and alkyl isocyanates to the corresponding methyamines and most Grignard reagents which react rapidly with isocyanates forming substituted amides.

The foregoing compounds constitute only a portion of the reactive isocyanate compounds which predominately comprise active hydrogen compounds. As is obvious to one skilled in the art, the present invention is not limited solely to these noted compounds. Other examples of compounds containing reactive isocyanate compounds, including active hydrogen compounds, can be found in reference materials such as *The Chemistry of the Organic Isocyanates* by J. H. Saunders and R. J. Slocombe, *Chemical Review*, American Chemical Society, 1948; and *Recent Advances in Isocyanate*

*Chemistry* by R. G. Arnold, J. A. Nelson and J. J. Verbanc, *Chemical Review*, American Chemical Society, 1956.

In general, the product formed between the reaction of the isocyanate terminated polymers and active hydrogen compounds as well as isocyanate reactive compounds exhibit the properties of the base polymers when the molecular weight of the active hydrogen compound is very small. Hence, such products may generally be used for the same purpose as the base polymer. Depending upon the base polymer, the products can be processed and used in applications according to their rubbery, plastic or elastic nature. Hence, many of the products may be cured and molded, and used for tire cord, tire tread and wire insulation.

In order that the invention is better understood, the reaction of isocyanate terminated base polymers with active hydrogen compounds as exemplified by various polymeric forming monomers which may be reacted with other monomers to produce novel block copolymer products will be discussed and explained in detail.

NYLON

The isocyanate terminated polymers of the polymeric composition can generally be reacted under certain conditions with nylon forming monomers to produce novel block copolymers having many properties characteristic of the nylons. However, unlike the nylons, the block copolymers have the properties of being moldable at temperatures below the melt temperature of the corresponding nylon and millable at ambient temperatures even when the block copolymer contains a high nylon content.

The lactams of the internal amides represent monomers which will undergo anionic polymerization and since they contain an active hydrogen, they will react with the isocyanate terminated polymers to form nylon block copolymers. These block copolymers when a diisocyanate is used to terminate the base polymer are generally of the BN type where N represents a nylon polymer and where B represents an isocyanate terminated polymer which preferably is formed from conjugated dienes, vinyl substituted aromatics and vinyl pyridines. If a triisocyanate is used, the BN type block copolymer will generally contain a base polymer or a nylon polymer grafted onto the back of the block copolymer. The lactams should contain at least 3 carbon atoms in the lactam ring and may be represented by the formula:

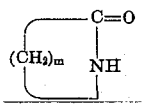

wherein *n* is a integer of at least 2 and up to 15 and preferably from 5 to 12. Examples of specific lactams include caprolactam and caprylactam.

It has been found that the formation of the nylon block copolymer must be carried out in an environment substantially free from active hydrogens such as water, alcohols, or acids except, of course, for the active hydrogen nylon forming monomers since the existance of active hydrogen compounds which react with the isocyanate terminated polymers is detrimental to the formation of the nylon block copolymer. Furthermore, since isocyanates react readily with water, care must be taken to insure that the process is carried out under anhydrous conditions. In the present process involving the formation of the nylon block copolymer, substantially free generally means that the content of water, and hence the active hydrogen content in the reaction, is generally below one hundred parts per million, and, preferably, the amount of water is generally below five parts per million. In order to achieve such low active hydrogen levels, it may be necessary to purge the reaction vessel with a relatively inert gas such as nitrogen so that an inert atmosphere exists. The temperature at which the polymerization is carried out is generally in a range between 0° and 260°C. and preferably between 120° and 180°C. In general, to produce a copolymer having favorable properties, it is desirable to polymerize at a temperature which is below the melting point of the corresponding nylon.

The resulting nylon block copolymers retain generally the favorable characteristics of the nylon. For example, the block copolymers generally exhibit the properties of good impact, good abrasion resistance, low coefficients of friction and toughness over a wide weight percent of the nylon to the total weight of the copolymer. Additionally, the processing properties of the base polymer are generally imparted to the nylon block copolymer. For example, the nylon block copolymers are readily millable and processable at ambient temperatures. Should free nylon exist in the polymeric composition as when an excess of polyfunctional isocyanate is used, the favorable processing properties will generally diminish as the amount of free nylon increases. As another example, if the base polymers are 1,2 polybutadiene or 1,4 polybutadiene, the resultant copolymers can respectively be molded either as plastics or as rubbbers, at temperatures below the melt temperature of the nylon.

The size or weight of the base polymer constituent and the nylon polymer constituent of the copolymer are generally not critical and can vary over a wide range depending upon the ultimate physical properties desired. Generally, the nylon polymer constituent can range from about 5 to about 99% of the total weight of the block polymer. The molecular weight of the nylon constituent, although usually not as important as the nylon content, may ordinarily vary from 20,000 to 30,000 and generally higher or lower if desired. The block copolymers generally are useful as rubbers at low and intermediate nylon content if the base polymer is 1,4 polybutadiene (hoses and the like), as plastics at low and intermediate nylon content if the base polymer is 1,2 polybutadiene (casters, gears and the like) and as fibers at high or roughly 75 to 99% nylon content if the base polymer is 1,4-polybutadiene (tire cord textile fibers and the like).

In order that one may more fully appreciate the invention, the properties of specific copolymers made in accordance with the concepts of the present invention will be briefly discussed. When the base polymer is formed of 1,4 polybutadiene microstructure and the nylon polymer is formed from caprolactam, the weight range of nylon may vary from 5 to 95% of the total block polymer weight with the weight range of nylon from about 25 to about 75% being preferred. This preferred type of block copolymer has properties generally characteristic of nylon such as impact resistance, high abrasion resistance, toughness and yet exhibits definite processing properties characteristic of rubbery compounds. Hence, the compound is easily millable and processable. If desired, the nylon content can be in excess of 75% and the block copolymer employed as textile fibers and as tire cord. A block polymer formed of 1,2 polybutadiene type properties including high heat distortion and can be suitably used as a thermoset even when the nylon content is as high as 50 to 80%. Another block polymer formed from either styrene or $\alpha$-methyl styrene and caprolactam with a nylon content in excess of 75% is advantageous for use as fibers and particularly for use as tire cords. It should thus be apparent from these specific examples that a vast number of possible nylon block copolymers can be made by using various types of compounds for each constituent and that a great number of tailor made block copolymers for specific end uses are thus within the scope of the present invention. Furthermore, many of the various copolymers may be generally milled with conventional additives and fillers and cured with conventional curatives such as sulfur compounds or organic peroxides to impart further desirable properties.

It has been found that when a particular class of organic peroxides is used to cure the nylon block copolymers, the copolymers exhibit even further improved properties, especially when the base polymer constituent has a high vinyl content. These organic peroxides can be represented by the following formula:

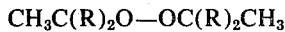

$$CH_3C(R)_2O-OC(R)_2CH_3$$

wherein R represents aryl or alkyl, including cycloalkyl, aralkyl, alkaryl, etc., of 1 – 20 carbon atoms, inclusive. Typical R groups include methyl, ethyl, propyl, butyl, hexyl, heptyl, decyl, dodecyl, octadecyl, phenyl, tolyl, xylyl, benzyl, phenthyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, and the like.

The organic peroxides of the above formula may be diperoxides or mixed peroxides, that is, peroxides which have two different $CH_3C(R)_2O \cdot$ radicals. Specific examples include dicumyl peroxide, a preferred peroxide, ditertiarybutyl peroxide, tertiarybutyl-cumyl peroxide, ditertiaryamyl peroxide, tertiarybutyltertiaryamyl peroxide, tertiaryamyl-cumyl peroxide, ditertiaryoctyl peroxide, bis(1,1-dipheynl-ethyl) peroxide, bi (1,1-dicyclohexyl-ethyl) peroxide, bis(1-cyclohexyl-1-methyl-ethyl) peroxide, bis(1-phenyl-1-ethyl-ethyl) peroxide, and the like. The symmetrical peroxides which have identical groups on each side of the peroxy oxygens are generally more available and therefore are preferred. However, mixed peroxides, when available, can be used very satisfactorily.

Whether mixed peroxides or diperoxides of the above class are used to impart to the block copolymers improved properties which are generally more favorable than if ordinary peroxides other than the above class were used, the peroxides used are advantageously those having a reasonably fast rate of decomposition at the temperature employed.

Copolymers containing unblocked or free nylons can also be made. Depending upon the amount of free nylon desired, the equivalent ratio of polyfunctional isocyanates to the lithium used in the formation of the base polymer is, of course, greater than 1 and such that completely unreacted polyisocyanates exist. When nylon block copolymers are made which contain free nylons, an additional co-catalyst such as sodium methoxide or sodium caprolatam is employed to help polymerize the lactams. The polymerization conditions with the exception of the equivalent ratio and the cocatalysts are generally the same as for the production of the nylon block copolymers. The existance of free nylon in nylon block copolymers generally does not hurt the properties of the thermoplastics, is usually helpful as a low molecular weight control and is useful in the production of fibers for tire cords.

The nylon block copolymers of the present invention can also be prepared in a suspension. The procedure followed is generally the same as described above to produce the nylon block copolymers except that the polymerization system is usually pressurized by the vapor pressure of the toluene or hydrocarbon base solvent. The preferable temperature of the polymerization is approximately 160°–170°C. When a non-pressurized polymerization is carried out, generally, commercial solvents such a mesitylene and purified Isopar G are suitable. The suspension polymers produced can be separated from the solvent as by drum drying or the polymers can be precipitated, as for example, by using methanol and are generally employed in various application similar to the nylon block copolymers.

In addition to the various types of monomers used to make the base polymer, the base polymer, as previously noted, may be a copolymer such as styrene-butadiene. A nylon block copolymer having such a base polymer when cured will also exhibit the general properties and uses of the previously mentioned nylon block copolymers.

The invention will be more fully understood by referring to the following examples which describe the preparation of various nylon block copolymers. Caprolactam was used in all of the examples since it is readily available.

EXAMPLE I

Block Copolymer of Polycaprolactam / 1,4 Polybutadiene (65/35)

To a clean dry 28 oz. beverage bottle was added 600 cc of purified toluene, 42.4 g of purified butadiene and 1.52 cc of 1.64 molar ($2.5 \times 10^{-3}$ moles) butyl lithium in hexane solution. The bottle was stirred overnight with a magnetic stirrer. The bottle was then cooled to $-78°C$. and 2.71 cc of a 0.92 molar ($2.5 \times 10^{-3}$ moles) toluene diisocyanate solution in toluene was rapidly added. The solution was stirred for one hour before 77.6 g of molten distilled caprolactam and 2.1 cc of a 10% solution of phenyl-beta-naphthylamine (PBNA) in toluene was added. The solution was then heated and stirred in an oil bath while being purged with nitrogen. Upon reaching 170°C. the caprolactam had sufficiently polymerized so that stirring is no longer possible. The reaction was continued for 2 hours at 170°C. and then the bottle was cooled and broken to give a polymer with an intrinsic viscosity in 1:1 phenol-tetrachloroethane at 25°C. of 1.91 and was 4.7% water soluble. Milling 100 g of this copolymer at 25°C. with 0.35 g of dicumyl peroxide gave a material that could be cured in 20 minutes at 175°C. to give a rubber with the following properties: 135% elongation, 4650 psi tensile, 226 psi 5% modulus, 4000 psi 100% modulus, 91 Shore A hardness. This polymer showed a 210°C. DTA melting point.

EXAMPLE II

Block Copolymer of Polycaprolactam / 1,4 Polybutadiene (50/50)

To a clean dry 28 oz. beverage bottle was added 600 cc of purified toluene, 60g of purified butadiene and 1.83 cc of 1.64 molar ($3 \times 10^{-3}$ moles) butyl lithium in hexane solution. The bottle was stirred overnight with a magnetic stirrer before 6.1 cc of a 0.49 molar ($3 \times 10^{-3}$ moles) isophorone diisocyanate solution in toluene was rapidly added at 25°C. The solution was stirred for 1 hour before 60 g of molten distilled caprolactam and 6.0 cc of a 10% solution of PBNA in toluene was added. The bottle was then heated and stirred in an oil bath while being purged with nitrogen. Upon reaching 170°C. the caprolactam polymerization had begun and stirring was no longer possible. The reaction was continued for 3 hours at 170°C. and then the bottle was cooled and broken. Milling 100 g of this copolymer with 5 g of zinc oxide, 2 g of sulfur, 2 g of stearic acid and 1.2 g of Santocure NS gave a material that could be cured at 150°C. for 30 minutes into a rubber that had the following properties: 127% elongation, 3875 psi tensile, 373 psi 5% modulus, 3775 psi 100% modulus and 91.5 Shore A hardness.

EXAMPLE III

Block Copolymer of Polycaprolactam / 1,2 Polybutadiene (74/26)

To a clean dry 28 oz. beverage bottle was added 600 cc of purified tetrahydrofuran, 31.4 g of purified butadiene and 2.02 cc of a 1.64 molar ($3.31 \times 10^{-3}$ moles) butyl lithium in hexane solution. The bottle was cooled to −20°C. and held at this temperature for 4 hours until the butadiene had polymerized. To this lithium polybutadiene which contained 85% 1,2-microstructure was added rapidly 2.70 cc of a 1.22 molar ($3.31 \times 10^{-3}$ moles) toluene diisocyanate solution in toluene. The solution was stirred for 1 hour before 88.6 g of distilled molten caprolactam and 1.6 cc of a 10% solution of PBNA in toluene was added. The solution was then heated and stirred in an oil bath with a nitrogen purge. Upon reaching 170°C. the caprolactam polymerization had begun and stirring was no longer possible. The reaction was continued for 2 hours at 170°C. and then the bottle was cooled and broken to give a polymer with an intrinsic viscosity in 1:1 phenol-tetrachloroethane at 25°C. of 3.80 and was 1.70% was soluble. Milling 100 g of this copolymer at 25°C. with 1.04 g of dicumyl peroxide gave a material that could be cured for 3 hours at 145°C. into a thermosetting resin with the following properties: 9800 psi flexural strength, 243,000 psi flexural modulus, 2.35 ft. lbs./inch notch Izod impact strength, 7 inch lbs. falling dart impact strength, (Gardner impact strength) 50E Rockwell hardness and 162°C. 264 psi heat distortion temperature.

EXAMPLE IV

Block Copolymer of Polycaprolactam / Polystyrene (50/50)

To a clean dry 28 oz. beverage bottle was added 600 cc of purified toluene, 80 g of purified styrene and 1.63 cc of 1.64 molar ($2.67 \times 10^{-3}$ moles) butyl lithium in hexane solution. The bottle was stirred overnight with a magnetic stirrer before 2.19 cc of a 1.22 molar ($2.67 \times 10^{-3}$ moles) toluene diisocyanate solution in toluene was rapidly added. The solution was stirred for 1 hour before 80 g of molten distilled caprolactam was added. Heating to 170°C. with a nitrogen purge for 3 hours gave a polymer with an intrinsic viscosity in 1:1 phenol tetrachloroethane at 25°C. of 2.36 and was 9.5% water soluble.

EXAMPLE V

Block Copolymer of Polycaprolactam / 1,4 Polybutadiene (65/35) Containing Unblocked Polycaprolactam Using the same procedure as in Example I, except that 0.76 cc of a 1.64 molar ($1.25 \times 10^{-3}$ moles) butyl lithium solution was used and before the polymerization of the caprolactam 0.57 cc of a 6.58 molar ($3.75 \times 10^{-3}$ moles) sodium methoxide solution in methanol was added. A copolymer was produced that had at least 67% of the polycaprolactam unblocked. This copolymer had an intrinsic viscosity of 1.05 and was 1.4% water soluble and could be milled with the sulfur curatives listed in Example II to give the following properties: 206% elongation, 4250 psi tensile, 259 psi 5% modulus, 3025 psi 100% modulus and 91.5 Shore A hardness.

EXAMPLE VI

Block Copolymer of Polycaprolactam/1,2-Polybutadiene (35/65) Containing Unblocked Polycaprolactam To a clean dry 28 oz. beverage bottle was added 600 cc of purified tetrahydrofuran, 77.6 g of purified butadiene and 1.52 cc of 1.64 molar ($2.49 \times 10^{-3}$ moles) butyl lithium in hexane solution. The bottle was cooled to −20°C. and held at this temperature for 4 hours until the butadiene had polymerized. To the lithium polybutadiene which contained 85% of 1,2-microstructure was rapidly added 5.92 cc of a 1.22 molar ($7.21 \times 10^{-3}$ moles) toluene diisocyanate solution in toluene. The solution was stirred for 1 hour before 42.4 g of molten distilled caprolactam, 3.9 cc of a 10% PBNA in toluene solution and 1.45 cc of a 6.55 molar ($9.5 \times 10^{-3}$ moles) of lithium methoxide in methanol solution was added. The mixture was heated to 170°C for 2 hours with a nitrogen purge to give a copolymer that had at least 79% of the polycaprolactam unblocked. This copolymer had an intrinsic viscosity of 1.11, was 2.9% water soluble and could be milled at room temperature was 2.6 parts of dicumyl peroxide per 100 parts of copolymer. After curing 3 hours at 145°C. the following properties were obtained: Flexural strength of 7,700 psi, flexural modulus of 215,000 psi, Izod impact of 1.34 ft. lbs./inch notch, falling dart impact of 1.75 inch lbs., Rockwell hardness of 71E and a 264 psi heat distortion temperature of 162°C. This sample had a crystalline melting point of 210°C. by DTA at 10° C./min.

EXAMPLE VII

Block Copolymer of Polycaprolactam/1,4 Polybutadiene (73/27) Prepared in Suspension To a clean dry 28 oz. beverage bottle was added 500 cc of distilled mesitylene, 116 g of purified butadiene and 7.25 cc of a 1.64 molar ($1.19 \times 10^{-2}$ moles) butyl lithium in hexane solution. The bottle was stirred overnight at 25°C. on a magnetic stirrer before rapidly adding 9.30 cc of a 1.28 molar ($1.19 \times 10^{-2}$ moles) toluene diisocyanate solution. This solution was stirred for 1 hour before 315 g of molten distilled caprolactam and 11.6 cc of a 10% PBNA solution was added. This solution was pressure transferred to a 2 liter resin kettle that had been previously thoroughly dried and purged with nitrogen. The solution was heated to 160°C. with rapid stirring and held at this temperature for 16 hours. The solution became opaque at about 130°C., indicating the onset of polymerization of the caprolactam. The final mixture was a finely divided suspension of 50% copolymer in mesitylene which showed almost no precipitation upon standing. The polymer was separated from the solvent by methanol precipitation to give a 25°C. millable copolymer with an intrinsic viscosity of 4.13.

EXAMPLE VIII

Block Copolymer of Polycaprolactam/1,2 Polybutadiene (71/29) Prepared in Suspension To a clean dry 28 oz. beverage bottle was added 600 cc of purified Isopar G, 4.0 cc of a 1.0 molar ($4 \times 10^{-3}$ moles) tetramethylethylene diamine solution in hexane, 31.4 g of purified butadiene and after cooling to $-25°$C., 2.0 cc of 1.64 molar ($3.28 \times 10^{-3}$ moles) butyl lithium in hexane solution was added. In 1 hour 77.6 g of molten distilled caprolactam and 3.2 cc of a 10% PBNA solution was added. This solution was then pressure transferred to a dry 2 liter resin kettle and was heated to 160°C. After 16 hours at 160°C. the reaction mixture consisted of an opaque suspension of the copolymer which would not readily separate. The polymer was precipitated in methanol to give a millable copolymer with an intrinsic viscosity of 4.10.

The elastomeric block copolymers produced by the present invention as noted above can be reinforced with conventional fillers such as silica ($SiO_2$), Novacite (smooth silica), and calcium carbonate with the silicas generally being preferred. Generally, a range from 75 to 225 parts of filler per 100 parts of block copolymer has been found to produce favorable results. The copolymers when cured by an organic peroxide, and especially when cured by an organic peroxide of the particular class noted above usually exhibits improved properties and improved heat distortion.

As a specific example of the improved properties, reference is made to the following table. The block copolymer of nylon 6/1,2 polybutadiene (74/26) having 83% vinyl structure was milled with 3 parts by weight of dicumyl peroxide to give, after 20 minutes of curing at 175°C., articles having the following properties:

|  | Silica | | Novacite | | Calcium Carbonate | |
|---|---|---|---|---|---|---|
| Filler | 100 | 200 | 100 | 200 | 100 | 200 |
| Vinyl Triacitoxy Silane | 2 | 4 | 2 | 4 | 2 | 4 |
| Flex Str. psi × $10^{-3}$ | 13.05 | 14.01 | 11.12 | 11.59 | 9.59 | 7.17 |
| Flex Mod. psi × $10^{-5}$ | 4.93 | 4.08 | 4.74 | 7.84 | 5.61 | 8.43 |
| Izod |  |  |  |  |  |  |
| notched Ft.-Lbs./In. | 0.49 | 0.52 | 0.70 | 0.45 | 0.39 | 0.44 |
| unnotched Ft.-Lbs./In. | — | 5.1 | 7.1 | 6.2 | 3.5 | 1.53 |
| Gardner Impact, in. lbs. | 6.01 | 5.0 | 6.75 | 4.8 | 3.5 | 1.75 |
| Rockwell E | 60 | 71.4 | 65 | 78.5 | 54.5 | 55 |
| Heat Dist. |  |  |  | broke |  |  |
| Temp. °C. at 264 psi | 220 | 215 | 180 | at 111 | 214 | 215 |

When the same block copolymer and ingredients were cured at 145°C. for 3 hours, the following properties were obtained:

|  | Silica | | Novacite | | Calcium Carbonate | |
|---|---|---|---|---|---|---|
| Filler | 100 | 200 | 100 | 200 | 100 | 200 |
| Vinyl Triacitoxy Silane | 2 | 4 | 2 | 4 | 2 | 4 |
| Flex. Str. psi × $10^{-3}$ | 13.53 | 13.70 | 14.22 | 15.43 | 10.00 | 7.17 |
| Flex Mod. psi × $10^{-5}$ | 4.97 | 7.85 | 5.00 | 8.83 | 5.51 | 9.32 |
| Izod |  |  |  |  |  |  |
| notched Ft.-Lbs./In. | 0.53 | 0.52 | 0.44 | 0.36 | 0.37 | 0.38 |
| unnotched Ft.-Lbs./In. | — | — | — | 6.02 | 3.7 | 0.89 |
| Gardner Impact, in. lbs. | 6.0 | 6.0 | 9.5 | 8.0 | 3.75 | 3.0 |
| Rockwell E | 66 | 75 | 68 | 91 | 58 | 61 |
| Heat Dist. |  |  |  |  |  |  |
| Temp. °C. at 264 psi | 219 | — | 198.5 | 220 | — | — |

Improved properties were also obtained when 150 parts of silica and 3 parts of vinyl triacetoxy silane were added to the above nylon block copolymer and cured with varying amounts of dicumyl peroxide at either 175°C. for 20 minutes or at 145°C. for 3 hours.

| Temp. °C. | 175°C. | | | | 145°C. | | | |
|---|---|---|---|---|---|---|---|---|
| Dicumpyl peroxide, pts. | 1 | 2 | 3 | 4 | 1 | 2 | 3 | 4 |
| Flex Str. psi × $10^{-3}$ | 14.14 | 13.00 | 12.47 | 13.16 | 13.04 | 13.03 | 12.88 | 12.75 |
| Flex Mod. psi × $10^{-5}$ | 6.60 | 6.28 | 6.68 | 6.53 | 6.26 | 6.01 | 6.29 | 5.90 |
| Izod |  |  |  |  |  |  |  |  |
| notched Ft.-Lbs./In. | 0.47 | 0.58 | 0.59 | 0.52 | 0.56 | 0.55 | 0.43 | 0.62 |
| unnotched ft.-Lbs./In. | 5.5 | 5.5 | 4.4 | 3.3 | 6.0 | 4.3 | 5.7 | 4.9 |
| Gardner Impact, in. lbs. | 6.0 | 5.6 | 5.5 | 5.3 | 6.9 | 6.6 | 7.0 | 6.0 |
| Rockwell E | 63.5 | 73 | 69 | 72 | 64 | 73 | 73 | 75 |
| Heat Dist. |  |  |  |  |  |  |  |  |
| Temp. °C. at 264 psi | 208 | 216 | 221 | 217 | 215 | 229 | 215 | 215 |

Yet another example of the improved properties is shown by the following table where the copolymer, nylon 6/1,2 polybutadiene, 90% vinyl structure, was milled with varying amounts of silica and dicumyl peroxide to give, after 20 minutes of curing at 175°C., the following properties;

| Sample No. | 1 | 2 | S-1 | S-2 |
| --- | --- | --- | --- | --- |
| Silica, pts. | 0 | 0 | 150 | 150 |
| Dicumyl Peroxide, pts. | 1 | 2 | 1 | 2 |
| Flex Str. psi $\times 10^{-3}$ | 6.15 | 6.27 | 10.39 | 11.70 |
| Flex Mod. psi $\times 10^{-5}$ | 1.46 | 1.52 | 5.34 | 6.09 |
| Izod notched Ft.-Lbs./In. | 1.2 | 0.9 | 0.6 | 0.65 |
| unnotched Ft.-Lbs./In. | 9.8 | 7.1 | 5.0 | 4.6 |
| Gardner Impact, in. lbs. | 9.0 | 7.3 | 20.3 | 11.0 |
| Rockwell E | 47.5 | 53.5 | 49 | 57 |

The unexpected general property of the base-nylon block copolymers being of soft or putty-like compositions at ambient temperatures, or at temperatures above the glass transition point of the base constituent but below the melting point of the nylon constituent, and thus readily processable at low temperatures is though to be attributed to the nature of the block copolymer synthesis which probably renders the base polymer constituent as the continuous phase. More specifically, all of the synthesis have been conducted in solvents which are usually good for the base constituent, be it rubber, vinyl, pyridine or quinoline derivatives, etc., but poor for the nylon constituent. Thus, presumably the base polymer formed the continuous phase. In support of this theory is the fact that the pliable nature of the various base block copolymers can be markedly decreased by dissolving them in a good solvent for the non-base constituent. For example, a rubber (butadiene)-nylon (poly $\epsilon$-caprolactam) block copolymer was dissolved in a 1 to 1 phenol-tetrachloroethane mixture, precipitated with methanol and then dried. The once pliable copolymer mixture was found to be quite hard and tough, much like nylon 6, and could not be milled or processed at ambient temperatures. Thus, the rubber portion of the block copolymer was no longer the continuous phase.

In view of the above, it was expected that the processing properties such as pliability or workability of the block copolymers would generally decrease as the molecular weight of the base constituent increased as is the case with rubber polymers. However, the elastomeric base-nylon block copolymers produced by the present invention where the base constituent is made from monomers of rubber, vinyl substituted aromatic, pyridine or quinoline derivatives as well as the other monomers listed on pages 7, 8 and 9, and where the nylon constituent is produced from lactams having 3–16 carbon atoms, have the surprising and unexpected property of a reciprocal plasticity which is generally directly proportional to molecular weight of the nylon constituent of the block copolymer. In other words, as the molecular weight of the nylon constituent increased, the pliability or workability of the base-nylon block copolymer decreased. This unexpected pliable property occurred at low temperatures, that is, at ambient temperatures for block copolymers having a rubber base polymer whereas for block copolymers having a base constituent made from monomers other than rubber, the unexpected pliability properties generally occurred at temperatures above the glass transition temperature of the base polymer but below the melting point of the nylon constituent. Hence, by low temperatures, it is meant a temperature which generally ranges from ambient to just below the melting point of the nylon constituent.

Although the exact reasons for this unusual property are not fully understood, it is generally thought that the nylon constituent of the block copolymer also exists as a part of the continuous phase. One reason in support of this theory is that it is rather difficult to imagine that only the base constituent of the block copolymer comprises the continuous phase in block copolymers wherein up to 90 weight percent is the nylon polymer constituent (88 volume percent for nylon 6). Another reason stems from the fact that in the aforementioned reaction between the base constituent, the isocyanates or isothiocyanates and the nylon monomers, components in addition to the desired block copolymers are formed. This result arises because the amount of polyisocyanate or polyisothiocyanate used in comparison to the lithium organo initiator is such to give an equivalent ratio greater than one in order to avoid coupling of the base polymers. However, in addition to coupled base polymers, which are impossible to eliminate, the excess of polyisocyanate or polyisothiocyanate promotes the formation of free or unblocked nylon polymers. Thus, the block copolymer composition in the case of a rubber base polymer contains rubber and nylon polymers in addition to the rubber-nylon block copolymer. When plasticity measurements were conducted on all of the various components of the block copolymer composition, it was found that a correlation between increasing molecular weight and decreasing pliability of the block copolymer composition existed only with the nylon constituent of the block copolymer. Thus, it was concluded that no obvious dependency of plasticity existed with the rubber portion of the block copolymer or any other composition component. Based upon these reasons, it is now believed that the nylon polymer constituent of the block copolymer exists as a part of the continuous phase of the copolymer compositions. Such a result was clearly unexpected.

Concerning the amount of pure block copolymer produced, a manner in which this amount can be increased is by the addition of the polyisocyanate or the polyisothiocyanate to the base polymer constituent at high temperatures, that is, at temperatures above room or ambient temperatures since the isocyanate compounds can more quickly disperse and reduce the occurrence of coupling. Similarly, addition of the isocyanate compounds mixing of the base constituent solution will also reduce the amount of coupling.

In the determination of the molecular weight dependence upon a particular component of the block copolymer composition, the composition was prepared by using both suspension and bulk techniques. Butadiene (conjugated diene) and styrene (vinyl substituted aromatic) were the monomers used to form the base polymer constituent whereas $\epsilon$-caprolactam was the monomer used to form the nylon polymer constituent. Generally the dienes and the vinyl substituted monomers such as styrene are preferred. In the formation of the nylon constituent, the polyisocyanate or polyisothiocyanate terminated or end-capped rubber polymers functioned as a cocatalyst in the anionic polymerization. Of course, the polymerization of the lactams is carried out in an environment substantially free from active hydrogens.

Formation of the rubber-nylon block copolymers according to the suspension polymerization method was generally carried out as follows with the amounts of the various reagents being varied, naturally, to produce a range of molecular weights of the various formed components.

General Suspension Polymerization Procedure

In a one-half gallon reactor, butadiene was polymerized in heptane using the appropriate amount of n-butyllithium initiator at 50°C. for 4 hours. Toluene diisocyanate was added to the formed polybutadienyl lithium solution followed immediately by the appropriate quantity of molten ε-caprolactam. The stirred solution was heated to 160°C. and polymerization of the ε-caprolactam was allowed to proceed for 16 hours. Water extraction of the copolymer showed that > 98% of the ε-caprolactam was converted. The final copolymer was a fine suspension in heptane. These polymers were recovered by precipitation with isopropanol and dried in a vacuum oven at 25°C. overnight. In those cases where a high 1,2 content was desirable in the polybutadiene portion of the block copolymers, N, N, N'N'-tetramethylethylene diamine (TMEDA) was added to the heptane before butadiene polymerization. The molar ratio of TMEDA to n-butyllithium employed was 1 to 1.

The following procedure was utilized to form a rubber-nylon block copolymer in bottles according to the bulk polymerization method.

General Bulk Polymerization Procedure

One part of phenyl-beta-naphthylamine (PBNA) antioxidant based on the polybutadiene was added after the ε-caprolactam was introduced into the bottle. This technique involved stripping off the solvent under nitrogen purge while heating to 170°C. The ε-caprolactam was then allowed to polymerize in bulk at 170°C. for 2 hours.

These same procedures were used to prepare the styrenenylon copolymers except that in the bulk process toluene was empolyed as the polymerizing solvent and the PBNA was eliminated.

Both the suspension and bulk techniques yielded similar rubber or vinyl products and block copolymers containing up to about 90 weight percent of nylon constituent were found to be pliable at low temperatures. This was true even though differential thermal analysis (DTA) measurements showed a crystalline melting point at 213°C. for the vinyl-nylon block copolymers as well as for the rubber-nylon block copolymers. The melting point of the block copolymers thus corresponds to the melting point of poly(6 aminocaproic acid), nylon 6, 213°C. Above 90 weight percent of ε-caprolactam, the block copolymers were no longer pliable at low temperatures.

The block copolymers were then separated into their components. The homopolystyrene in the styrene-ε-caprolactam block copolymer composition was recovered by dispersing a one gram sample in toluene and stirring overnight. Centrifugation of the suspension yielded a clear solution containing polystyrene and a negligible amount of styrene-ε-caprolactam block polymer. The toluene insoluble portion was further fractionated with m-cresol solvent and cyclohexane nonsolvent. Through this procedure it was possible to isolate all three components, i.e., polystyrene, styrene-ε-caprolactam block polymer and nylon 6, from the composition.

With polybutadiene copolymers the fractionation was complicated by the fact that the toluene dissolved a considerable amount of the butadiene-ε-caprolactam block polymer. This problem was alleviated by using isopentane when the polybutadiene portion was composed mainly of 1,4 units and tetramethylsilane when a high proportion of 1,2 units were present. In both suspension and bulk polymerizations, it was possible to isolate the homopolybutadiene from the rest of the block copolymer composition. The block copolymer and the homopoly-ε-caprolactam were then isolated as before.

A number of samples made by the above bulk and suspension methods, in which the amounts of the various ingredients were varied to produce a range of molecular weights for the various components, were then tested. Specific plasticity measurements were made on exactly one-half gram samples and the reciprocal plasticity determined. In accordance with standard testing techniques, the samples were preheated at 100°C. in a Carver press for 10 seconds before applying 2000 psi for 30 seconds at 100°C. The sample areas were measured with a planimeter.

In the test results of various samples set forth below, the base constituent was made from polybutadiene and the isocyanate compound was toluene diisocyanate. The molecular weight of the nylon constituent (nylon 6) of the block copolymer was determined by the following formula:

$$M_1 = W_c \cdot M_2 / W_6(2M-1)$$

where $M_1$ is the molecular weight of the block nylon 6, $M_2$ is the molecular weight of the block polybutadiene constituent as measured by Gel Permeation Chromatography. $W_c$ and $W_b$ are, respectively, the weight fractions of the ε-caprolactam and the butadiene charged to the reaction, and M is the molar ratio of the TDI to the polybutadienyl lithium. The data obtained from numerous examples are set forth in Table I.

TABLE I

Molecular Weight of Butadiene-Nylon 6 Block Copolymers Vs. Plasticity

| Sample No. | $W_c$ | M | $M_1 \times 10^{-3}$ (g/mole) (Calc.) | $M_2 \times 10^{-3}$ (g/mole) | Reciprocal Plasticity $\times 10^2$ (cm$^{-2}$) |
|---|---|---|---|---|---|
| 1 | 50.0 | 2.16 | 3.3 | 10.8 | 1.36 |
| 2 | 26.1 | 1.18 | 4.2 | 16.0 | 1.63 |
| 3 | 67.0 | 1.32 | 8.0 | 6.6 | 1.59 |
| 4 | 35.3 | 1.26 | 8.6 | 24.0 | 2.36 |
| 5 | 64.7 | 2.33 | 9.0 | 17.8 | 1.91 |
| 6 | 67.0 | 1.16 | 12.0 | 7.8 | 2.39 |
| 7 | 67.0 | 2.34 | 13.1 | 23.8 | 3.19 |
| 8 | 73.8 | 1.33 | 13.7 | 8.1 | 3.75 |
| 9 | 50.0 | 1.14 | 17.8 | 22.8 | 3.65 |
| 10 | 67.0 | 1.85 | 18.0 | 24.0 | 3.62 |
| 11 | 67.0 | 1.18 | 18.0 | 12.1 | 4.43 |
| 12 | 73.8 | 1.30 | 22.9 | 13.0 | 5.03 |
| 13 | 75.2 | 1.38 | 23.8 | 13.8 | 4.34 |
| 14 | 74.0 | 1.17 | 27.6 | 13.0 | 5.78 |
| 15 | 35.3 | 1.00 | 28.1 | 51.5 | 4.48 |

TABLE I-Continued

Molecular Weight of Butadiene-Nylon 6 Block Copolymers Vs. Plasticity

| Sample No. | $W_c$ | M | $M_1 \times 10^{-3}$ (g/mole) (Calc.) | $M_2 \times 10^{-3}$ (g/mole) | Reciprocal Plasticity $\times 10^2$ (cm$^{-2}$) |
|---|---|---|---|---|---|
| 16 | 79.9 | 1.40 | 30.9 | 14.0 | 5.68 |
| 17 | 75.6 | 1.38 | 36.1 | 20.5 | 6.37 |
| 18 | 73.7 | 1.03 | 37.0 | 14.0 | 7.35 |
| 19 | 73.0 | 1.17 | 38.1 | 18.9 | 8.13 |
| 20 | 74.0 | 1.05 | 38.8 | 15.0 | 7.63 |
| 21 | 73.7 | 0.84 | 49.2 | 12.2 | 10.40 |

Study of Table I reveals that the only item which shows any correlation with the plasticity (reciprocal) of the block copolymer is the molecular weight of the nylon constituent. Moreover, this correlation is not influenced by the weight fraction of the homo-nylon 6 in the mixture or by the molecular weight of the polybutadiene constituent of the block copolymer. As revealed by the drawing, the plasticity correlation is quite accurate over a wide range of molecular weight of the nylon constituent of the block copolymer. These facts thus lend support to the theory that the block nylon constituent is part of the continuous phase of the copolymer composition.

Since it is often desirable to process copolymers at various plasticities or pliabilities in order to make various different types of articles, nylon block copolymers of the present invention having a particular molecular weight range of the nylon constituent will be favored in many applications. In order to produce such block copolymers, the various ingredients can be charged into the reaction vessel in amounts in accordance with the above formula. For example, the molecular weight of the base portion of the block copolymer can be readily determined and produced by methods well known to one skilled in the art, such as by selecting a specific number of millimoles of organo metallic initiator per 100 grams of base monomer. Once the molecular weight of the base portion has been selected, the weight fraction of the nylon monomer can be selected as well as the molar ratio M and the corresponding amounts of ingredients charged into a reaction vessel to produce a block copolymer. The reaction upon completion or termination will yield a block copolymer having a nylon constituent of the desired molecular weight and having the predetermined pliability. This method is preferred.

However, as known to one skilled in the art, many other methods may be used to obtain a nylon block copolymer having a predetermined and desired plasticity. For example, an excess of nylon monomer could be added to the reaction vessel and the nylon constituent polymerization continued until the desired molecular weight was achieved at which point the reaction would be terminated as by adding short stopping agents or agents containing an active hydrogen. Knowledge of the molecular weight at any time could be obtained as through a viscosity correlation of composition or by any other of a number of ways.

The base-nylon block copolymer compositions so processed can, of course, by used for any of the previously noted items such as fibers, tire cord, hoses, and in myriad applications wherever nylon type properties are required and ready processability is desired.

Regardless of the method or manner in producing a block copolymer having a nylon constituent of a particular molecular weight and a predetermined plasticity, one can tailor make a host of such nylon block copolymers to suit various processing operations be it injection molding, extrusion molding, calendering or any other process.

It can be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A process for producing in a reaction vessel a nylon-base block copolymer composition wherein a selected predetermined pliability of the block copolymer composition at low temperatures corresponds to the molecular weight of the nylon constituent, comprising the steps of: anionically polymerizing monomers selected from the group consisting of olefin, conjugated diene, vinyl substituted aromatic, vinyl substituted pyridine, vinyl substituted quinoline,

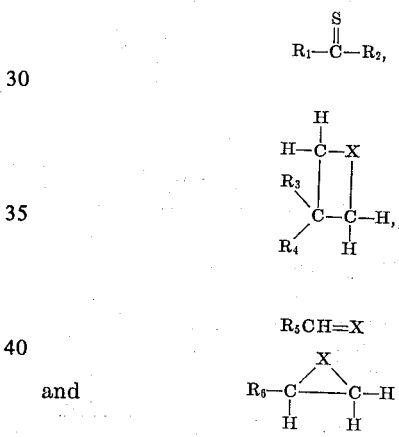

where
$R_1$, $R_2$, $R_3$, $R_4$, $R_5$ and $R_6$ are selected from the group consisting of an aliphatic containing from 1 to 15 carbon atoms, a cycloaliphatic containing from 4 to 15 carbon atoms and an aromatic containing from 6 to 15 carbon atoms; where $R_6$ is also an H; and where X is O or S, in the presence of an organo alkali metal initiator to form alkali metal terminated base polymers, rapidly adding a sufficient amount of a compound selected from the group consisting of a polyisocyanate and a polyisothiocyanate and having the formula $R(N=C=X)n$ where R is an aliphatic group having from 2 to about 20 carbon atoms, a cycloaliphatic group having from 4 to about 20 carbon atoms and an aromatic group having from 6 to about 20 carbon atoms where n is an integer of 2 or 3 and X is either an oxygen or a sulfur atom to said base polymer so that at least 5 percent of said base polymers are end capped by at least one compound selected from said group consisting of a polyisocyanate and a polyisothiocyanate, conducting said polyisocyanate or said polyisothiocyanate end capping step in an environment substantially free from compounds containing active hydrogens at a temperature of from −100°C to +150°C, reacting said end capped base polymer with lactams having from 3 to 16 total carbon atoms to partially form the nylon polymer constituent of the block copolymer, conducting said nylon polymerization step in an environment substantially free from compounds containing active hydrogens at a temperature of from 0°C to 260°C, continuing said nylon polymerization until the molecular weight of the nylon constituent corresponds to a predetermined plasticity, and terminating said nylon polymerization to yield a nylon-base block copolymer composition having the selected predetermined pliability at low temperatures.

2. A process for producing a nylon-base block copolymer composition of a predetermined pliability at low temperatures as in claim 1, wherein said organo alkali metal initiator has the formula RLi where R is selected from the group consisting of an aliphatic having from 1 to 30 carbon atoms, a cycloaliphatic having from 4 to 30 carbon atoms and an aromatic having from 6 to 30 carbon atoms.

3. A process for producing a nylon-base block copolymer composition of a predetermined pliability at low temperatures as in claim 2, wherein said organo lithium initiator is n-butyllithium.

4. A process for producing a nylon-base block copolymer composition of a predetermined pliability at low temperatures as in claim 1, wherein said base monomers are selected from the group consisting of conjugated dienes and vinyl substituted aromatics.

5. A process for producing a nylon-base block copolymer composition of a predetermined pliability at low temperatures as in claim 4, wherein said base monomers are selected from the group consisting of butadiene, isoprene, styrene, α-methylstyrene and 4-t-butylstyrene and a styrene-butadiene copolymer.

6. A process for producing a nylon-base block copolymer composition of a predetermined pliability at low temperatures as in claim 1, wherein said lactams are selected from the group consisting of caprolactam and caprylactam.

7. A process for producing a nylon-base block copolymer composition of a predetermined pliability at low temperatures as in claim 1, wherein said environment contains less than 100 parts per million of active hydrogen compounds.

8. A process for producing a nylon-base block copolymer composition of a predetermined pliability at low temperatures as in claim 1, wherein said polyisocyanates and polyisothiocyanates are selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate, pentamethylene diisocyanate, para-phenylene diisothiocyanate, metaphenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanate and pentamethylene diisothiocyanate.

9. A process for producing a nylon-base block copolymer composition of a predetermined pliability at low temperatures as in claim 1, including the additional steps of adding a predetermined amount of lactams to the reaction vessel and carrying said nylon polymerization to completion to obtain a specific molecular weight corresponding to the selected predetermined pliability.

10. A process for producing a nylon-base block copolymer composition of a predetermined pliability at low temperatures as in claim 1, wherein an amount of said compounds selected from the group consisting of a polyisocyanate and a polyisothiocyanate to said base polymer is such so that at least 20% of said base polymers are end capped by at least one compound selected from the group consisting of a polyisocyanate and a polyisothiocyanate.

* * * * *

PO-1050
(5/69)

UNITED STATES PATENT OFFICE
CERTIFICATE OF CORRECTION

Patent No. 3,859,382       Dated January 7, 1975

Inventor(s) William Lee Hergenrother & Richard J. Ambrose

It is certified that error appears in the above-identified patent and that said Letters Patent are hereby corrected as shown below:

Column 8, line 9 "threated" should be -- treated --

Column 15, line 48, "1.70% was soluble" should read --1.70% was water soluble --

In the table at the bottom of columns 17 and 18, "Dicumpyl" in the first line should be -- Dicumyl--

In column 20, line 57, "compounds mixing" should read -- compounds during mixing --

In column 22, line 39, the formula "$M_1 = W_c \cdot M_2/W_6(2M-1)$" should be-- $M_1 = W_c \cdot M_2/W_b(2M-1)$ Signed and sealed this 8th day of April 1975.

(SEAL)
Attest:

RUTH C. MASON
Attesting Officer

C. MARSHALL DANN
Commissioner of Patents
and Trademarks